US012701585B2

(12) United States Patent
Mu

(10) Patent No.: US 12,701,585 B2
(45) Date of Patent: Aug. 4, 2026

(54) METHOD AND APPARATUS FOR SENDING DOWNLINK TRANSMISSION, METHOD AND APPARATUS FOR RECEIVING DOWNLINK TRANSMISSION, AND DEVICE AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 381 days.

(21) Appl. No.: 18/284,853

(22) PCT Filed: Apr. 1, 2021

(86) PCT No.: PCT/CN2021/085020
§ 371 (c)(1),
(2) Date: Sep. 28, 2023

(87) PCT Pub. No.: WO2022/205337
PCT Pub. Date: Oct. 6, 2022

(65) Prior Publication Data
US 2024/0179720 A1 May 30, 2024

(51) Int. Cl.
*H04W 72/232* (2023.01)
*H04L 1/00* (2006.01)
*H04W 52/58* (2009.01)

(52) U.S. Cl.
CPC ......... *H04W 72/232* (2023.01); *H04L 1/0003* (2013.01); *H04L 1/0007* (2013.01); *H04W 52/58* (2013.01)

(58) Field of Classification Search
CPC .. H04W 72/232; H04W 52/58; H04L 1/0003; H04L 1/0007
See application file for complete search history.

(56) References Cited

U.S. PATENT DOCUMENTS

| 10,291,378 B1 | 5/2019 | Bai et al. |
| 2017/0231011 A1 | 8/2017 | Park et al. |
| 2019/0306876 A1 | 10/2019 | Golitschek Edler von Elbwart et al. |

(Continued)

FOREIGN PATENT DOCUMENTS

| CN | 111602355 A | 8/2020 |
| CN | 111699740 A | 9/2020 |

(Continued)

OTHER PUBLICATIONS

International Search Report of PCT/CN2021/085020 dated Jan. 6, 2022 with English translation, (4p).

(Continued)

*Primary Examiner* — Benjamin H Elliott, IV
*Assistant Examiner* — Tracy Lauren Raimondo
(74) *Attorney, Agent, or Firm* — Arch & Lake LLP; Hao Tan; Shen Wang

(57) ABSTRACT

A method for sending a downlink transmission is provided. The method includes sending the downlink transmission to a user equipment (UE). A downlink control information (DCI) in the downlink transmission includes transport block size (TBS) scaling indication information, and the TBS scaling indication information is used for indicating a scaling factor used in performing TBS scaling.

18 Claims, 3 Drawing Sheets the base station sends the message Msg.4 to the Redcap terminal, the DCI of the message Msg.4 includes TBS scaling indication information, and the TBS scaling indication information is used for indicating a scaling factor used in performing of TBS scaling
301 the Redcap terminal receives the message Msg.4 from the base station
302 the Redcap terminal determines, based on the TBS scaling indication information included in the DCI of the message Msg.4, the scaling factor used in performing of the TBS scaling
303

(56) References Cited

U.S. PATENT DOCUMENTS

| | | | |
|---|---|---|---|
| 2019/0312708 A1 | 10/2019 | Bai et al. | |
| 2019/0313426 A1 | 10/2019 | Lin et al. | |
| 2019/0349116 A1* | 11/2019 | Hosseini | .............. H04L 1/0011 |
| 2020/0022218 A1* | 1/2020 | Chang | ................... H04W 88/06 |

FOREIGN PATENT DOCUMENTS

| | | | |
|---|---|---|---|
| CN | 111937334 A | 11/2020 | |
| CN | 112106321 A | 12/2020 | |
| CN | 112262538 A | 1/2021 | |

OTHER PUBLICATIONS

Lenovo, Motorola Mobility, "TBS determination for partial UL subframes", 3GPP TSG RAN WG1 Meeting 92bis, R1-1805153, Sanya, China, Apr. 16-20, 2018, (3p).
The First CNOA issued in Application No. 202180000937.7, dated Mar. 25, 2023, (9p).

* cited by examiner sending a downlink transmission to a UE, a DCI in the downlink transmission includes TBS scaling indication information, and the TBS scaling indication information is used for indicating a scaling factor used in performing of TBS scaling

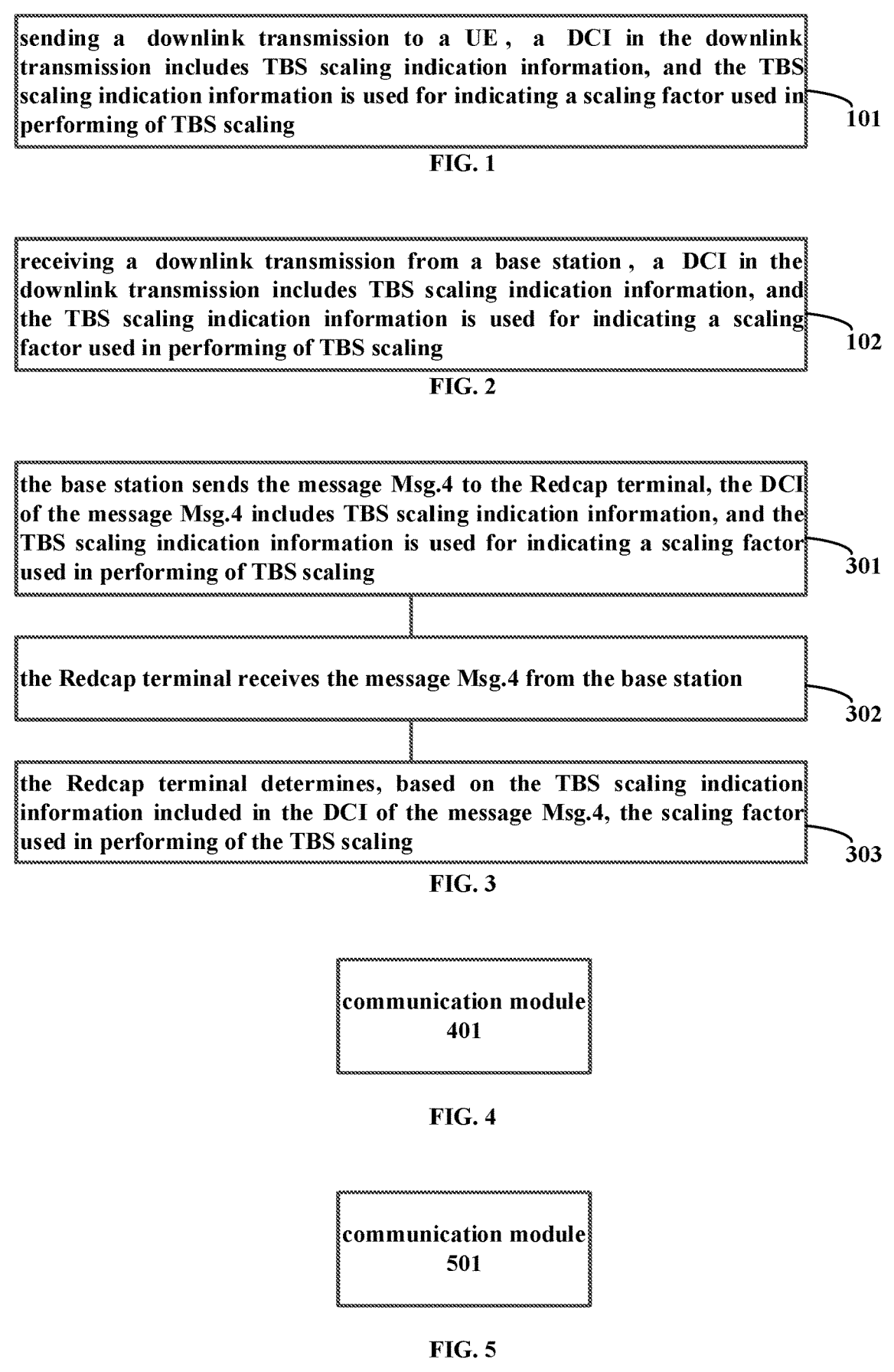

101

FIG. 1 receiving a downlink transmission from a base station, a DCI in the downlink transmission includes TBS scaling indication information, and the TBS scaling indication information is used for indicating a scaling factor used in performing of TBS scaling

102

FIG. 2 the base station sends the message Msg.4 to the Redcap terminal, the DCI of the message Msg.4 includes TBS scaling indication information, and the TBS scaling indication information is used for indicating a scaling factor used in performing of TBS scaling

301 the Redcap terminal receives the message Msg.4 from the base station

302 the Redcap terminal determines, based on the TBS scaling indication information included in the DCI of the message Msg.4, the scaling factor used in performing of the TBS scaling

303

FIG. 3 communication module
401

FIG. 4 communication module
501

FIG. 5

METHOD AND APPARATUS FOR SENDING DOWNLINK TRANSMISSION, METHOD AND APPARATUS FOR RECEIVING DOWNLINK TRANSMISSION, AND DEVICE AND STORAGE MEDIUM

CROSS-REFERENCE TO RELATED APPLICATION

The present application is the U.S. National Stage of International Application No. PCT/CN2021/085020, filed on Apr. 1, 2021, the disclosure of which is incorporated herein by reference in its entirety for all purposes.

BACKGROUND

In a long term evolution (LTE) 4G system, in order to support the internet of thing (IoT) services, two technologies of a machine type communication (MTC) and a narrow band internet of thing (NB-IoT) are proposed. The two technologies are mainly directed to low-rate and high-latency scenarios, such as scenarios of meter reading and environmental monitoring, or the like. For example, NB-IoT currently can only support a maximum rate of several hundreds of K, and MTC currently can only support a rate of several M.

SUMMARY

The present disclosure relates to the field of wireless communication technologies, and in particular, to a method and apparatus for sending a downlink transmission, a method and apparatus for receiving a downlink transmission, a device and a storage medium. In view of this, the present disclosure provides a method and apparatus for sending a downlink transmission, a method and apparatus for receiving a downlink transmission, a device and a storage medium.

According to a first aspect of the present disclosure, a method for sending a downlink transmission is provided. This method is applied to a base station, and includes sending the downlink transmission to a user equipment (UE). A downlink control information (DCI) in the downlink transmission includes transport block size (TBS) scaling indication information, and the TBS scaling indication information is used for indicating a scaling factor used in performing of TBS scaling.

According to a second aspect of the present disclosure, a method for receiving a downlink transmission is provided. The method is applied to a UE, and includes receiving the downlink transmission from a base station. A DCI in the downlink transmission includes TBS scaling indication information, and the TBS scaling indication information is used for indicating a scaling factor used in performing of TBS scaling.

According to a third aspect of the present disclosure, a network device is provided. The network device includes a processor and a memory. The memory is configured to store an executable instruction executable by the processor.

The processor is configured to execute the executable instruction in the memory to implement steps of the method for sending the downlink transmission according to the first aspect.

According to a fourth aspect of the present disclosure, a mobile terminal is provided. The mobile terminal includes a processor and a memory. The memory is configured to store an executable instruction executable by the processor.

The processor is configured to execute the executable instruction in the memory to implement steps of the method for receiving the downlink transmission according to the second aspect.

According to a fifth aspect of the present disclosure, a non-transitory computer-readable storage medium is provided. The computer-readable storage medium stores an executable instruction, and the executable instruction, when executed by a processor, implements steps of the method for sending the downlink transmission according to the first aspect, or implements steps of the method for receiving the downlink transmission according to the second aspect.

It should be understood that the above general description and the following detailed description are merely exemplary and explanatory, and do not limit the present disclosure.

BRIEF DESCRIPTION OF THE DRAWINGS

The accompanying drawings described herein are used to provide a further understanding of the embodiments of the present disclosure and constitute a part of the present application. The illustrative embodiments of the embodiments of the present disclosure and the description of them are used to explain the embodiments of the present disclosure, and do not constitute an improper limitation to the embodiments of the present disclosure.

The accompanying drawings, which are incorporated in and constitute a part of the description, illustrate embodiments consistent with the embodiments of the present disclosure, and together with the description, serve to explain the principles of the embodiments of the present disclosure.

FIG. 1 is a flowchart of a method for sending a downlink transmission illustrated according to an embodiment.

FIG. 2 is a flowchart of a method for receiving a downlink transmission illustrated according to an embodiment.

FIG. 3 is a flowchart of a method for sending and receiving a downlink transmission illustrated according to an embodiment.

FIG. 4 is a block diagram of an apparatus for sending a downlink transmission illustrated according to an embodiment.

FIG. 5 is a block diagram of an apparatus for receiving a downlink transmission illustrated according to an embodiment.

DETAILED DESCRIPTION

Figure 6:
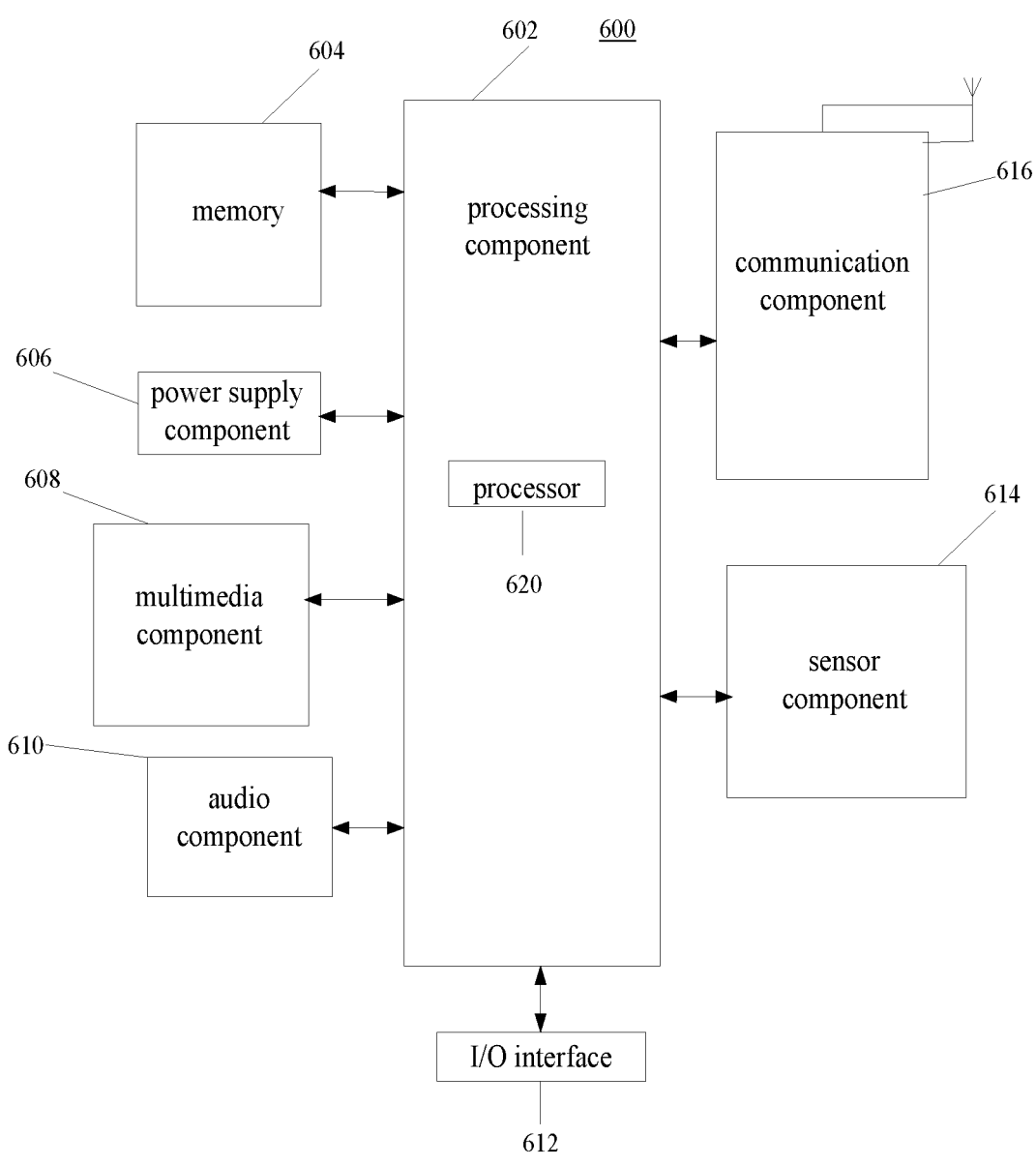
FIG. 6 is a block diagram of an apparatus for receiving a downlink transmission illustrated according to an embodiment.

The embodiments of the present disclosure are further described with reference to the accompanying drawings and the detailed description.

The embodiments are described in detail here, examples of which are illustrated in the accompanying drawings. When the following description involves the accompanying drawings, unless otherwise indicated, the same numbers in different drawings represent the same or similar elements. The implementations described in the following embodiments do not represent all implementations consistent with the embodiments of the present disclosure. On the contrary, they are merely examples of apparatus and methods consistent with some aspects of the present disclosure as detailed in the appended claims.

It should be noted that, in an embodiment of the present disclosure, a plurality of steps may be included; for ease of description, these steps are numbered; however, these numbers are not limited to the execution time slot and the execution sequence between the steps; these steps may be implemented in any sequence, and the embodiments of the present disclosure do not limit to this.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

With the continuous development of the IOT services, services such as video monitoring, smart home, wearable devices, and industrial sensing monitoring are gradually popularized. These services generally require a rate of tens of M to 100 M, while also having relatively high requirements for latency. Therefore, it is difficult for MTC and NB-IOT technologies in LTE to satisfy these requirements. Based on this situation, many companies propose redesigning a new user equipment in 5G new radio to cover the requirements of such a terminal IoT device. In the current 3rd generation partnership project (3GPP) standardization, such a new terminal type is called as a reduced capability (Redcap) user equipment (UE), or referred to as a UE based on new radio-lite (NR-lite). Similar to the IoT device in LTE, such a UE based on 5G NR-lite generally needs to satisfy the following requirements: low cost, low complexity, coverage enhancement to a certain degree, power saving, etc. For a Redcap UE, that is, for a Redcap terminal, coverage loss will be brought due to capability reduction of the terminal. For example, when the receiving antenna of the Redcap terminal is reduced from four to one, the downlink coverage will be affected, and therefore coverage enhancement needs to be performed. When coverage enhancement is performed, the Redcap terminal needs to perform TBS Scaling.

It should be noted that this method may be applied to scenarios where a base station sends a random access message to a UE, such as the scenario where a message Msg.4 is sent.

An embodiment of the present disclosure provides a method for sending a downlink transmission. This method is applied to a base station, and may be executed independently or in conjunction with any other embodiment of the embodiments of the present disclosure. FIG. 1 is a flowchart of a method for sending a downlink transmission illustrated according to an embodiment. As shown in FIG. 1, the method includes the following step 101.

At step 101, a downlink transmission is sent to a UE. A DCI in the downlink transmission includes TBS scaling indication information, and the TBS scaling indication information is used for indicating a scaling factor used in performing of TBS scaling.

In an embodiment, the base station sends the downlink transmission to the UE, for example, the base station sends a message Msg.4 to the UE. A DCI of the downlink transmission includes the TBS scaling indication information, and the TBS scaling indication information is used for indicating a scaling factor used in performing of TBS scaling by the UE. The UE here is, for example, a Redcap terminal. The Redcap terminal achieves the goal of reducing an encoding bit rate by using different scaling factors.

In an embodiment, the TBS scaling indication information corresponds to a 2-bit field. The 2-bit field indicates a scaling factor as shown in Table 1. The TBS scaling fields listed in Table 1 and their corresponding scaling factors are only illustrative and may be adjusted according to actual application scenarios. It can be understood that each element in Table 1 exists independently, and these elements are exemplarily listed in the same table, but it does not mean that all elements in the table must exist simultaneously as shown in the table. The value of each element is independent of any other element values in Table 1. Therefore, those skilled in the art can understand that the values of each element in Table 1 are independent embodiments.

TABLE 1

| TBS scaling field | scaling factor |
|---|---|
| 00 | 1 |
| 01 | 0.5 |
| 10 | 0.25 |
| 11 | |

The actual application scenario is not limited to using a 2-bit field to correspond to the TBS scaling indication information, nor is it limited to the correspondence relationship between the TBS scaling field and the scaling factor in Table 1 above.

In this embodiment, the base station can indicate, to the UE when sending the downlink transmission, the scaling factor used in performing of the TBS scaling, thus satisfying the requirements of the UE for performing coverage enhancement and improving the reception effect of the UE, such as when receiving antennas are reduced.

An embodiment of the present disclosure provides a method for sending a downlink transmission. This method is applied to a base station, and may be executed independently or in conjunction with any other embodiment of the embodiments of the present disclosure. The method includes sending a downlink transmission to a UE. A DCI in the downlink transmission includes TBS scaling indication information, and the TBS scaling indication information is used for indicating a scaling factor used in performing of TBS scaling. In this embodiment, the DCI including the TBS scaling indication information does not include a field used for indicating power control.

In an embodiment, the base station sends the downlink transmission to the UE, and when the DCI of the downlink transmission includes the TBS scaling indication information, the DCI does not include a field used for indicating the power control. When the UE has a requirement for coverage enhancement, the base station generally uses full power to send the downlink transmission. Therefore, there is no need to perform power control on the downlink transmission sent by the base station. In this case, all or part of the bits in the field, originally used for indicating the power control, in the DCI of the downlink transmission, may be multiplexed to correspond to the TBS scaling indication information. That is, an information field originally used for indicating the power control is changed to an information field used for transmitting the TBS scaling indication information.

In an embodiment, the base station sends the downlink transmission to the UE, and n bits in a DCI of the downlink transmission are used for transmitting the TBS scaling indication information, or used for indicating the power control. Of course, this field may also be used for carrying other information, and the embodiments of the present disclosure do not limit to this.

In a possible implementation, n=2. In an embodiment, the correspondence relationship between the 2 bit corresponding to the TBS scaling indication information and the scaling factor may be exemplarily shown in Table 1. The TBS scaling fields listed in Table 1 and their corresponding scaling factors are only illustrative and may be adjusted according to actual application scenarios.

In this embodiment, all of the field, originally used for indicating the power control, in the DCI may be multiplexed to correspond to the TBS scaling indication information. On the one hand, the scaling factor used in performing of the TBS scaling may be indicated to the UE, and on the other hand, the information field in the DCI may be fully utilized.

An embodiment of the present disclosure provides a method for sending a downlink transmission. This method is applied to a base station, and may be executed independently or in conjunction with any other embodiment of the embodiments of the present disclosure. The method includes sending a downlink transmission to a UE. A DCI in the downlink transmission includes TBS scaling indication information, and the TBS scaling indication information is used for indicating a scaling factor used in performing of TBS scaling. In this embodiment, the DCI including the TBS scaling indication information includes N bits used for indicating power control, where N is less than M. A DCI not including the TBS scaling indication information includes M bits used for indicating the power control, where N and M are positive integers.

In an embodiment, the base station sends the downlink transmission to the UE, and when the DCI of the downlink transmission includes the TBS scaling indication information, the TBS scaling indication information corresponds to part of the bits in the field, originally used for indicating the power control, in the DCI. When the UE has a requirement for coverage enhancement, the base station generally uses a higher power to send the downlink transmission. Therefore, the base station may not use all of the bits in the field originally used for indicating the power control to indicate power control information. In this case, part of the bits in the field, originally used for indicating the power control, in the DCI of the downlink transmission may be multiplexed to correspond to the TBS scaling indication information.

In an embodiment, the base station sends the downlink transmission to the UE, and when the DCI of the downlink transmission includes the TBS scaling indication information, the DCI including the TBS scaling indication information includes 1 bit (N=1) used for indicating the power control. When the DCI does not include the TBS scaling indication information, the DCI includes 2 bits (M=2) used for indicating the power control. The TBS scaling indication information corresponds to 1 bit of the 2 bits in addition to the 1 bit used for indicating the power control.

In an embodiment, the correspondence relationship between the 1 bit corresponding to the TBS scaling indication information and the scaling factor may be shown, for example, in Tables 2, 3, and 4. The TBS scaling fields and corresponding scaling factors listed in Tables 2, 3, and 4 are only illustrative and may be adjusted according to actual application scenarios.

TABLE 2

| TBS scaling field | scaling factor |
|---|---|
| 0 | 1 |
| 1 | 0.5 |

TABLE 3

| TBS scaling field | scaling factor |
|---|---|
| 0 | 1 |
| 1 | 0.25 |

TABLE 4

| TBS scaling field | scaling factor |
|---|---|
| 0 | 0.5 |
| 1 | 0.25 |

It can be understood that each element in Tables 2, 3, and 4 exists independently, and these elements are exemplarily listed in the same table, but it does not mean that all elements in the table must exist simultaneously as shown in the table. The value of each element is independent of any other element values in Tables 2, 3, and 4. Therefore, those skilled in the art can understand that the values of each element in Tables 2, 3, and 4 are independent embodiments.

In this embodiment, part of the field, originally used for indicating the power control, in the DCI is multiplexed to correspond to the TBS scaling indication information. On the one hand, the scaling factor used in performing of the TBS scaling may be indicated to the UE, and on the other hand, the information field in the DCI may be fully utilized.

An embodiment of the present disclosure provides a method for sending a downlink transmission. This method is applied to a base station, and may be executed independently or in conjunction with any other embodiment of the embodiments of the present disclosure. The method includes sending a downlink transmission to a UE. A DCI in the downlink transmission includes TBS scaling indication information, and the TBS scaling indication information is used for indicating a scaling factor used in performing of TBS scaling. In this embodiment, the DCI including the TBS scaling indication information includes S bits used for indicating an MCS, where S is less than T. A DCI not including the TBS scaling indication information includes T bits used for indicating the MCS, where S and T are positive integers. That is, the bit, used for indicating the MCS when the DCI does not include the TBS scaling indication information, may be used for indicating the MCS and the TBS scaling indication information when the DCI includes the TBS scaling indication information.

In an embodiment, the base station sends the downlink transmission to the UE, and when the DCI of the downlink transmission includes the TBS scaling indication information, the TBS scaling indication information corresponds to part of the bits in the field, originally used for indicating the MCS, in the DCI. When the UE has a requirement for coverage enhancement, the base station generally does not indicate the use of the MCS of a high order and a high bit rate, that is, the base station only indicates the MCS of a low order and a low bit rate. Therefore, the base station may not use all of the bits in the field originally used for indicating the MCS to indicate MCS information. In this case, part of the bits in the field, originally used for indicating the MCS, in the DCI of the downlink transmission may be multiplexed to correspond to the TBS scaling indication information.

In an embodiment, the base station sends the downlink transmission to the UE, and when the DCI of the downlink transmission includes the TBS scaling indication information, the DCI including the TBS scaling indication information includes 3 bits (S=3) used for indicating the MCS. When the DCI does not include the TBS scaling indication information, the DCI includes 5 bits (T=5) used for indicating the MCS. The TBS scaling indication information corresponds to 2 bits of the 5 bits in addition to the 3 bits used for indicating the MCS.

In an embodiment, the correspondence relationship between the 2 bits corresponding to the TBS scaling indication information and the scaling factor may be shown, for example, in Table 1. The TBS scaling fields and corresponding scaling factors listed in Table 1 are only illustrative and may be adjusted according to actual application scenarios.

In this embodiment, part of the field, originally used for indicating the MCS, in the DCI is multiplexed to correspond to the TBS scaling indication information. On the one hand, the scaling factor used in performing of the TBS scaling may be indicated to the UE, and on the other hand, the information field in the DCI may be fully utilized.

An embodiment of the present disclosure provides a method for sending a downlink transmission. This method is applied to a base station, and may be executed independently or in conjunction with any other embodiment of the embodiments of the present disclosure. The method includes sending a downlink transmission to a UE. A DCI in the downlink transmission includes TBS scaling indication information, and the TBS scaling indication information is used for indicating a scaling factor used in performing of TBS scaling. In this embodiment, the DCI including the TBS scaling indication information includes S bits used for indicating an MCS, where S is less than T. A DCI not including the TBS scaling indication information includes T bits used for indicating the MCS, where S and T are positive integers. The DCI including the TBS scaling indication information includes T–S bits used for indicating the MCS, and the T–S bits used for indicating the MCS are used for indicating the MCS of a low order and a low bit rate.

In an embodiment, the base station sends the downlink transmission to the UE, and when the DCI of the downlink transmission includes the TBS scaling indication information, the DCI including the TBS scaling indication information includes 3 bits used for indicating the MCS. When the DCI does not include the TBS scaling indication information, the DCI includes 5 bits used for indicating the MCS. The TBS scaling indication information corresponds to 2 bits of the 5 bits in addition to the 3 bits used for indicating the MCS. The DCI includes 3 bits used for indicating the MCS of a low order and a low bit rate.

In this embodiment, part of the field, originally used for indicating the MCS, in the DCI is multiplexed to correspond to the TBS scaling indication information. On the one hand, the scaling factor used in performing of the TBS scaling may be indicated to the UE, and on the other hand, the information field in the DCI may be fully utilized.

An embodiment of the present disclosure provides a method for sending a downlink transmission. This method is applied to a base station, and may be executed independently or in conjunction with any other embodiment of the embodiments of the present disclosure. The method includes sending a downlink transmission to a UE. A DCI in the downlink transmission includes TBS scaling indication information, and the TBS scaling indication information is used for indicating a scaling factor used in performing of TBS scaling. In this embodiment, the DCI including the TBS scaling indication information includes S bits used for indicating an MCS, where S is less than T. A DCI not including the TBS scaling indication information includes T bits used for indicating the MCS, where S and T are positive integers. The TBS scaling indication information corresponds to a combined field in the DCI. The combined field includes at least one bit used for indicating power control and at least one bit used for indicating the MCS.

In an embodiment, the base station sends the downlink transmission to the UE, the DCI of the downlink transmission includes the TBS scaling indication information, the TBS scaling indication information corresponds to a combined field in the DCI, and the combined field includes at least one bit of the field used for indicating the power control and at least one bit of the filed used for indicating the MCS. In this case, the number of the bit, used for indicating the MCS, in the DCI that includes the TBS scaling indication information is less than the number of the bit, used for indicating the MCS, in the DCI that does not include the TBS scaling indication information.

In an embodiment, when the DCI does not include the TBS scaling indication information, the DCI may include 2 bits used for indicating the power control and 5 bits used for indicating the MCS. When the DCI includes the TBS scaling indication information, the TBS scaling indication information corresponds to a combined field in the DCI, and the combined field includes 1 bit of the 2 bits used for indicating the power control and 1 bit of the 5 bits used for indicating the MCS. In this application scenario, the TBS scaling indication information corresponds to a 2-bit combined field. It should be illustrated that there is no limitation for the front-to-back position, in the combined field, of the 1 bit of the 2 bits used for indicating the power control and the 1 bit of the 5 bits used for indicating the MCS.

In an embodiment, the correspondence relationship between the 2 bits corresponding to the TBS scaling indication information and the scaling factor may be shown, for example, in Table 1. The TBS scaling fields and corresponding scaling factors listed in Table 1 are only illustrative and may be adjusted according to actual application scenarios.

In this embodiment, part of the field, originally used for indicating the power control, in the DCI, and part of the field, originally used for indicating the MCS, in the DCI is multiplexed to correspond to the TBS scaling indication information. On the one hand, the scaling factor used in performing of the TBS scaling may be indicated to the UE, and on the other hand, the information field in the DCI may be fully utilized.

An embodiment of the present disclosure provides a method for sending a downlink transmission. This method is applied to a base station, and may be executed independently or in conjunction with any other embodiment of the embodiments of the present disclosure. The method includes sending a downlink transmission to a UE. A DCI in the downlink transmission includes TBS scaling indication information, and the TBS scaling indication information is used for indicating a scaling factor used in performing of TBS scaling. In this embodiment, the TBS scaling indication information corresponds to T bits used for indicating an MCS, and a DCI not including the TBS scaling indication information includes T bits used for indicating the MCS, where T is a positive integer.

In an embodiment, the base station sends the downlink transmission to the UE, and when the DCI of the downlink transmission includes the TBS scaling indication information, the TBS scaling indication information corresponds to all of the bits in the field, originally used for indicating the MCS, in the DCI. That is, all of the bits in the field, originally used for indicating the MCS, in the DCI of the downlink transmission are multiplexed to correspond to the TBS scaling indication information.

In an embodiment, when the DCI does not include the TBS scaling indication information, the DCI includes 5 bits used for indicating the MCS. The base station sends the downlink transmission to the UE, and when the DCI of the downlink transmission includes the TBS scaling indication information, the TBS scaling indication information corresponds to 5 bits used for indicating the MCS in the DCI.

In this embodiment, all of the field, originally used for indicating the MCS, in the DCI is multiplexed to correspond to the TBS scaling indication information. On the one hand, the scaling factor used in performing of the TBS scaling may be indicated to the UE, and on the other hand, the information field in the DCI may be fully utilized.

An embodiment of the present disclosure provides a method for sending a downlink transmission. This method is applied to a base station, and may be executed independently or in conjunction with any other embodiment of the embodiments of the present disclosure. The method includes sending a downlink transmission to a UE. A DCI in the downlink transmission includes TBS scaling indication information, and the TBS scaling indication information is used for indicating a scaling factor used in performing of TBS scaling. In this embodiment, the TBS scaling indication information corresponds to T bits used for indicating an MCS, and a DCI not including the TBS scaling indication information includes T bits used for indicating the MCS, where T is a positive integer. The T bits used for indicating the MCS indicate both the MSC and the scaling factor used in performing of the TBS scaling.

In an embodiment, the base station sends the downlink transmission to the UE, and when the DCI of the downlink transmission includes the TBS scaling indication information, the TBS scaling indication information corresponds to all of the bits in the field, originally used for indicating the MCS, in the DCI. In this application scenario, all of the bits used for indicating the MCS indicate both the MSC and the scaling factor used in performing of the TBS scaling.

In an embodiment, when the DCI does not include the TBS scaling indication information, the DCI includes 5 bits used for indicating the MCS. The base station sends the downlink transmission to the UE, and when the DCI of the downlink transmission includes the TBS scaling indication information, the TBS scaling indication information corresponds to 5 bits used for indicating the MCS in the DCI. Herein, the 5 bits indicate both the MSC and the scaling factor used in performing of the TBS scaling.

In an embodiment, the 5 bits that indicate both the MCS and the scaling factor used in performing of the TBS scaling are jointly encoded with the indicated MCS and scaling factor as shown in Table 5. The correspondence relationship between the MCS index value and the scaling factor listed in Table 5 is only illustrative and may be adjusted according to actual application scenarios.

TABLE 5

| MCS index value | modulation order $Q_m$ | target bit rate $R_x$ | spectral efficiency | scaling factor |
|---|---|---|---|---|
| 0 | 2 | 120 | 0.2344 | 1 |
| 1 | 2 | 120 | 0.2344 | 0.5 |

TABLE 5-continued

| MCS index value | modulation order $Q_m$ | target bit rate $R_x$ | spectral efficiency | scaling factor |
|---|---|---|---|---|
| 2 | 2 | 120 | 0.2344 | 0.25 |
| 3 | 2 | 157 | 0.3066 | 1 |
| 4 | 2 | 157 | 0.3066 | 0.5 |
| 5 | 2 | 157 | 0.3066 | 0.25 |
| 6 | 2 | 193 | 0.3770 | 0.5 |
| 7 | 2 | 193 | 0.3770 | 0.25 |
| 8 | 2 | 251 | 0.4902 | 0.5 |
| 9 | 2 | 251 | 0.4902 | 0.25 |
| 10 | 2 | 308 | 0.6016 | 0.5 |
| 11 | 2 | 308 | 0.6016 | 0.25 |
| 12 | 2 | 379 | 0.7402 | 0.5 |
| 13 | 2 | 379 | 0.7402 | 0.25 |
| 14 | 2 | 449 | 0.8770 | 0.5 |
| 15 | 2 | 449 | 0.8770 | 0.25 |
| 16 | 2 | 526 | 1.0273 | 0.5 |
| 17 | 2 | 526 | 1.0273 | 0.25 |
| 18 | 2 | 602 | 1.1758 | 0.5 |
| 19 | 2 | 602 | 1.1758 | 0.25 |
| 20 | 2 | 679 | 1.3262 | 0.5 |
| 21 | 2 | 679 | 1.3262 | 0.25 |
| 22 | 4 | 340 | 1.3281 | 0.25 |
| 23 | 4 | 378 | 1.4766 | 0.25 |
| 24 | 4 | 434 | 1.6953 | 0.25 |
| 25 | 4 | 490 | 1.9141 | 0.25 |
| 26 | 4 | 553 | 2.1602 | 0.25 |
| 27 | 4 | 616 | 2.4063 | 0.25 |
| 28 | 4 | 658 | 2.5703 | 0.25 |
| 29 | 2 | reservation | | |
| 30 | 4 | reservation | | |
| 31 | 6 | reservation | | |

It can be understood that each element in Table 5 exists independently, and these elements are exemplarily listed in the same table, but it does not mean that all elements in the table must exist simultaneously as shown in the table. The value of each element is independent of any other element values in Table 5. Therefore, those skilled in the art can understand that the values of each element in Table 5 are independent embodiments.

In this embodiment, the MCS index value corresponds to 5 bits that indicates both the MCS and the scaling factor. For example, when the 5 bits are 00000, the MCS index value is 0; when the 5 bits are 00001, the MCS index value is 1; when the 5 bits are 00010, the MCS index value is 2; and when the 5 bits are 00011, the MCS index value is 3; . . . when the 5 bits are 11111, the MCS index value is 31.

In this embodiment, all of the field, originally used for indicating the MCS, in the DCI is multiplexed to correspond to the TBS scaling indication information. On the one hand, the scaling factor used in performing of the TBS scaling may be indicated to the UE, and on the other hand, the information field in the DCI may be fully utilized.

An embodiment of the present disclosure provides a method for sending a downlink transmission. This method is applied to a base station, and may be executed independently or in conjunction with any other embodiment of the embodiments of the present disclosure. The method includes sending a downlink transmission to a UE. A DCI in the downlink transmission includes TBS scaling indication information, and the TBS scaling indication information is used for indicating a scaling factor used in performing of TBS scaling. In this embodiment, the TBS scaling indication information corresponds to T bits used for indicating an MCS, and a DCI not including the TBS scaling indication information includes T bits used for indicating the MCS, where T is a positive integer. Each index value of X index values indicated by the T bits used for indicating the MCS corresponds to a scaling factor, where X is less than Y, Y is a maximum number of indexes that the T bits used for indicating the MCS are capable of indicating, and X and Y are positive integers.

In an embodiment, when the DCI does not include the TBS scaling indication information, the DCI includes 5 bits used for indicating the MCS. The base station sends the downlink transmission to the UE, and when the DCI of the downlink transmission includes the TBS scaling indication information, the TBS scaling indication information corresponds to 5 bits used for indicating the MCS in the DCI. Herein, the 5 bits indicate 29 index values, and each of the index values corresponds to a scaling factor, as shown in Table 5. In this embodiment, the maximum number of indexes that the 5 bits are capable of indicating is 25=32. The 5 bits indicate 29 index values, for example, when the 5 bits are 00000, the MCS index value is 0; when the 5 bits are 00001, the MCS index value is 1; when the 5 bits are 00010, the MCS index value is 2; when the 5 bits are 00011, the MCS index value is 3; . . . when the 5 bits are 11100, the MCS index value is 28; a total of 29 index values. The correspondence relationship between the MCS index value and the scaling factor listed in Table 5 is only illustrative and may be adjusted according to actual application scenarios.

In this embodiment, all of the field, originally used for indicating the MCS, in the DCI is multiplexed to correspond to the TBS scaling indication information. On the one hand, the scaling factor used in performing of the TBS scaling may be indicated to the UE, and on the other hand, the information field in the DCI may be fully utilized.

An embodiment of the present disclosure provides a method for sending a downlink transmission. This method is applied to a base station, and may be executed independently or in conjunction with any other embodiment of the embodiments of the present disclosure. The method includes sending a downlink transmission to a UE. A DCI in the downlink transmission includes TBS scaling indication information, and the TBS scaling indication information is used for indicating a scaling factor used in performing of TBS scaling. In this embodiment, the TBS scaling indication information corresponds to T bits used for indicating an MCS, and a DCI not including the TBS scaling indication information includes T bits used for indicating the MCS, where T is a positive integer. Each index value of X index values indicated by the T bits used for indicating the MCS corresponds to a scaling factor, where X is less than Y, Y is a maximum number of indexes that the T bits used for indicating the MCS are capable of indicating, and X and Y are positive integers. At least two sets of index values of the X index values correspond to a same scaling factor subset.

In an embodiment, when the DCI does not include the TBS scaling indication information, the DCI includes 5 bits used for indicating the MCS. The base station sends the downlink transmission to the UE, and when the DCI of the downlink transmission includes the TBS scaling indication information, the TBS scaling indication information corresponds to 5 bits used for indicating the MCS in the DCI. The 5 bits indicate 29 index values, and each of the index values corresponds to a scaling factor. In this embodiment, a set of index values 0, 1, 2 and another set of index values 3, 4, 5 correspond to the same scaling factor subset {1, 0.5, 0.25}; a set of index values 6, 7 and another set of index values 8, 9 as well as yet another set of index values 10, 11 correspond to the same scaling factor subset {0.5, 0.25}, and so on, as shown in Table 5. The correspondence relationship between the MCS index value and the scaling factor listed in Table 5 is only illustrative and may be adjusted according to actual application scenarios.

In this embodiment, all of the field, originally used for indicating the MCS, in the DCI is multiplexed to correspond to the TBS scaling indication information. On the one hand, the scaling factor used in performing of the TBS scaling may be indicated to the UE, and on the other hand, the information field in the DCI may be fully utilized.

An embodiment of the present disclosure provides a method for receiving a downlink transmission. This method is applied to a UE, and may be executed independently or in conjunction with any other embodiment of the embodiments of the present disclosure. FIG. 2 is a flowchart of a method for receiving a downlink transmission illustrated according to an embodiment. As shown in FIG. 2, the method includes the following step 201.

At step 201, a downlink transmission from a base station is received. A DCI in the downlink transmission includes TBS scaling indication information, and the TBS scaling indication information is used for indicating a scaling factor used in performing of TBS scaling.

In an embodiment, the UE receives the downlink transmission from the base station, for example, a Redcap terminal receives a message Msg.4 from the base station. A DCI of the downlink transmission includes the TBS scaling indication information, and the TBS scaling indication information is used for indicating a scaling factor used in performing of TBS scaling by the UE. The Redcap terminal achieves the goal of reducing an encoding bit rate by using different scaling factors.

In this embodiment, the UE can receive, when receiving the downlink transmission from the base station, the scaling factor used in performing of the TBS scaling, thus satisfying the requirements of the UE for performing coverage enhancement and improving the reception effect of the UE, such as when receiving antennas are reduced.

An embodiment of the present disclosure provides a method for receiving a downlink transmission. This method is applied to a UE, and may be executed independently or in conjunction with any other embodiment of the embodiments of the present disclosure. The method includes receiving a downlink transmission from a base station. A DCI in the downlink transmission includes TBS scaling indication information, and the TBS scaling indication information is used for indicating a scaling factor used in performing of TBS scaling. In this embodiment, the DCI including the TBS scaling indication information does not include a field used for indicating power control.

In an embodiment, the UE receives the downlink transmission, and when the DCI of the downlink transmission includes the TBS scaling indication information, the DCI does not include a field used for indicating the power control. When the UE has a requirement for coverage enhancement, the base station generally uses full power to send the downlink transmission. Therefore, there is no need to perform power control on the downlink transmission sent by the base station. In this case, all or part of the bits in the field, originally used for indicating the power control, in the DCI of the downlink transmission, may be multiplexed to correspond to the TBS scaling indication information.

In this embodiment, all of the field, originally used for indicating the power control, in the DCI may be multiplexed to correspond to the TBS scaling indication information. On the one hand, the scaling factor used in performing of the TBS scaling may be received by the UE, and on the other hand, the information field in the DCI may be fully utilized.

An embodiment of the present disclosure provides a method for receiving a downlink transmission. This method is applied to a UE, and may be executed independently or in conjunction with any other embodiment of the embodiments of the present disclosure. The method includes receiving a downlink transmission from a base station. A DCI in the downlink transmission includes TBS scaling indication information, and the TBS scaling indication information is used for indicating a scaling factor used in performing of TBS scaling. In this embodiment, the DCI including the TBS scaling indication information includes N bits used for indicating power control, where N is less than M. A DCI not including the TBS scaling indication information includes M bits used for indicating the power control, where N and M are positive integers.

In an embodiment, the UE receives the downlink transmission, and when the DCI of the downlink transmission includes the TBS scaling indication information, the TBS scaling indication information corresponds to part of the bits in the field, originally used for indicating the power control, in the DCI. When the UE has a requirement for coverage enhancement, the base station generally uses a higher power to send the downlink transmission. Therefore, the base station may not use all of the bits in the field originally used for indicating the power control to indicate power control information. In this case, part of the bits in the field, originally used for indicating the power control, in the DCI of the downlink transmission may be multiplexed to correspond to the TBS scaling indication information.

In this embodiment, part of the field, originally used for indicating the power control, in the DCI is multiplexed to correspond to the TBS scaling indication information. On the one hand, the scaling factor used in performing of the TBS scaling may be received by the UE, and on the other hand, the information field in the DCI may be fully utilized.

An embodiment of the present disclosure provides a method for receiving a downlink transmission. This method is applied to a UE, and may be executed independently or in conjunction with any other embodiment of the embodiments of the present disclosure. The method includes receiving a downlink transmission from a base station. A DCI in the downlink transmission includes TBS scaling indication information, and the TBS scaling indication information is used for indicating a scaling factor used in performing of TBS scaling. In this embodiment, the DCI including the TBS scaling indication information includes S bits used for indicating an MCS, where S is less than T. A DCI not including the TBS scaling indication information includes T bits used for indicating the MCS, where S and T are positive integers.

In an embodiment, the UE receives the downlink transmission, and when the DCI of the downlink transmission includes the TBS scaling indication information, the TBS scaling indication information corresponds to part of the bits in the field, originally used for indicating the MCS, in the DCI. When the UE has a requirement for coverage enhancement, the base station generally does not indicate the use of the MCS of a high order and a high bit rate, that is, the base station only indicates the MCS of a low order and a low bit rate. Therefore, the base station may not use all of the bits in the field originally used for indicating the MCS to indicate MCS information. In this case, part of the bits in the field, originally used for indicating the MCS, in the DCI of the downlink transmission may be multiplexed to correspond to the TBS scaling indication information.

In this embodiment, part of the field, originally used for indicating the MCS, in the DCI is multiplexed to correspond to the TBS scaling indication information. On the one hand, the scaling factor used in performing of the TBS scaling may be received by the UE, and on the other hand, the information field in the DCI may be fully utilized.

An embodiment of the present disclosure provides a method for receiving a downlink transmission. This method is applied to a UE, and may be executed independently or in conjunction with any other embodiment of the embodiments of the present disclosure. The method includes receiving a downlink transmission from a base station. A DCI in the downlink transmission includes TBS scaling indication information, and the TBS scaling indication information is used for indicating a scaling factor used in performing of TBS scaling. In this embodiment, the DCI including the TBS scaling indication information includes S bits used for indicating an MCS, where S is less than T. A DCI not including the TBS scaling indication information includes T bits used for indicating the MCS, where S and T are positive integers. The DCI including the TBS scaling indication information includes T−S bits used for indicating the MCS, and the T−S bits used for indicating the MCS are used for indicating the MCS of a low order and a low bit rate.

In an embodiment, the UE receives the downlink transmission, and when the DCI of the downlink transmission includes the TBS scaling indication information, the DCI including the TBS scaling indication information includes 3 bits used for indicating the MCS. When the DCI does not include the TBS scaling indication information, the DCI includes 5 bits used for indicating the MCS. The TBS scaling indication information corresponds to 2 bits of the 5 bits in addition to the 3 bits used for indicating the MCS. The 3 bits included in the DCI and used for indicating the MCS are used for indicating the MCS of a low order and a low bit rate.

In this embodiment, part of the field, originally used for indicating the MCS, in the DCI is multiplexed to correspond to the TBS scaling indication information. On the one hand, the scaling factor used in performing of the TBS scaling may be received by the UE, and on the other hand, the information field in the DCI may be fully utilized.

An embodiment of the present disclosure provides a method for receiving a downlink transmission. This method is applied to a UE, and may be executed independently or in conjunction with any other embodiment of the embodiments of the present disclosure. The method includes receiving a downlink transmission from a base station. A DCI in the downlink transmission includes TBS scaling indication information, and the TBS scaling indication information is used for indicating a scaling factor used in performing of TBS scaling. In this embodiment, the DCI including the TBS scaling indication information includes S bits used for indicating an MCS, where S is less than T. A DCI not including the TBS scaling indication information includes T bits used for indicating the MCS, where S and T are positive integers. The TBS scaling indication information corresponds to a combined field in the DCI. The combined field includes at least one bit used for indicating power control and at least one bit used for indicating the MCS.

In an embodiment, the UE receives the downlink transmission, the DCI of the downlink transmission includes the TBS scaling indication information, the TBS scaling indication information corresponds to a combined field in the DCI, and the combined field includes at least one bit of the field used for indicating the power control and at least one bit of the filed used for indicating the MCS. In this case, the number of the bit, used for indicating the MCS, in the DCI that includes the TBS scaling indication information is less than the number of the bit, used for indicating the MCS, in the DCI that does not include the TBS scaling indication information.

In this embodiment, part of the field, originally used for indicating the power control, in the DCI, and part of the field, originally used for indicating the MCS, in the DCI is multiplexed to correspond to the TBS scaling indication information. On the one hand, the scaling factor used in performing of the TBS scaling may be received by the UE, and on the other hand, the information field in the DCI may be fully utilized.

An embodiment of the present disclosure provides a method for receiving a downlink transmission. This method is applied to a UE, and may be executed independently or in conjunction with any other embodiment of the embodiments of the present disclosure. The method includes receiving a downlink transmission from a base station. A DCI in the downlink transmission includes TBS scaling indication information, and the TBS scaling indication information is used for indicating a scaling factor used in performing of TBS scaling. In this embodiment, the TBS scaling indication information corresponds to T bits used for indicating an MCS, and a DCI not including the TBS scaling indication information includes T bits used for indicating the MCS, where T is a positive integer.

In an embodiment, the UE receives the downlink transmission, and when the DCI of the downlink transmission includes the TBS scaling indication information, the TBS scaling indication information corresponds to all of the bits in the field, originally used for indicating the MCS, in the DCI. That is, all of the bits in the field, originally used for indicating the MCS, in the DCI of the downlink transmission are multiplexed to correspond to the TBS scaling indication information.

In this embodiment, all of the field, originally used for indicating the MCS, in the DCI is multiplexed to correspond to the TBS scaling indication information. On the one hand, the scaling factor used in performing of the TBS scaling may be received by the UE, and on the other hand, the information field in the DCI may be fully utilized.

An embodiment of the present disclosure provides a method for receiving a downlink transmission. This method is applied to a UE, and may be executed independently or in conjunction with any other embodiment of the embodiments of the present disclosure. The method includes receiving a downlink transmission from a base station. A DCI in the downlink transmission includes TBS scaling indication information, and the TBS scaling indication information is used for indicating a scaling factor used in performing of TBS scaling. In this embodiment, the TBS scaling indication information corresponds to T bits used for indicating an MCS, and a DCI not including the TBS scaling indication information includes T bits used for indicating the MCS, where T is a positive integer. The T bits used for indicating the MCS indicate both the MSC and the scaling factor used in performing of the TBS scaling.

In an embodiment, the UE receives the downlink transmission, and when the DCI of the downlink transmission includes the TBS scaling indication information, the TBS scaling indication information corresponds to all of the bits in the field, originally used for indicating the MCS, in the DCI. In this application scenario, all of the bits used for indicating the MCS indicate both the MSC and the scaling factor used in performing of the TBS scaling.

In this embodiment, all of the field, originally used for indicating the MCS, in the DCI is multiplexed to correspond to the TBS scaling indication information. On the one hand, the scaling factor used in performing of the TBS scaling may be received by the UE, and on the other hand, the information field in the DCI may be fully utilized.

An embodiment of the present disclosure provides a method for receiving a downlink transmission. This method is applied to a UE, and may be executed independently or in conjunction with any other embodiment of the embodiments of the present disclosure. The method includes receiving a downlink transmission from a base station. A DCI in the downlink transmission includes TBS scaling indication information, and the TBS scaling indication information is used for indicating a scaling factor used in performing of TBS scaling. In this embodiment, the TBS scaling indication information corresponds to T bits used for indicating an MCS, and a DCI not including the TBS scaling indication information includes T bits used for indicating the MCS, where T is a positive integer. Each index value of X index values indicated by the T bits used for indicating the MCS corresponds to a scaling factor, where X is less than Y, Y is a maximum number of indexes that the T bits used for indicating the MCS are capable of indicating, and X and Y are positive integers.

In an embodiment, when the DCI does not include the TBS scaling indication information, the DCI includes 5 bits used for indicating the MCS. The base station sends the downlink transmission to the UE, and when the DCI of the downlink transmission includes the TBS scaling indication information, the TBS scaling indication information corresponds to 5 bits used for indicating the MCS in the DCI. Herein, the 5 bits indicate 29 index values, and each of the index values corresponds to a scaling factor, as shown in Table 5.

In this embodiment, all of the field, originally used for indicating the MCS, in the DCI is multiplexed to correspond to the TBS scaling indication information. On the one hand, the scaling factor used in performing of the TBS scaling may be received by the UE, and on the other hand, the information field in the DCI may be fully utilized.

An embodiment of the present disclosure provides a method for receiving a downlink transmission. This method is applied to a UE, and may be executed independently or in conjunction with any other embodiment of the embodiments of the present disclosure. The method includes receiving a downlink transmission from a base station. A DCI in the downlink transmission includes TBS scaling indication information, and the TBS scaling indication information is used for indicating a scaling factor used in performing of TBS scaling. In this embodiment, the TBS scaling indication information corresponds to T bits used for indicating an MCS, and a DCI not including the TBS scaling indication information includes T bits used for indicating the MCS, where T is a positive integer. Each index value of X index values indicated by the T bits used for indicating the MCS corresponds to a scaling factor, where X is less than Y, Y is a maximum number of indexes that the T bits used for indicating the MCS are capable of indicating, and X and Y are positive integers. At least two sets of index values of the X index values correspond to a same scaling factor subset.

In an embodiment, when the DCI does not include the TBS scaling indication information, the DCI includes 5 bits used for indicating the MCS. The base station sends the downlink transmission to the UE, and when the DCI of the downlink transmission includes the TBS scaling indication information, the TBS scaling indication information corresponds to 5 bits used for indicating the MCS in the DCI. The 5 bits indicate 29 index values, and each of the index values corresponds to a scaling factor. In this embodiment, a set of index values 0, 1, 2 and another set of index values 3, 4, 5 correspond to the same scaling factor subset {1, 0.5, 0.25}; a set of index values 6, 7 and another set of index values 8, 9 as well as yet another set of index values 10, 11 correspond to the same scaling factor subset {0.5, 0.25}, and so on, as shown in Table 5.

In this embodiment, all of the field, originally used for indicating the MCS, in the DCI is multiplexed to correspond to the TBS scaling indication information. On the one hand, the scaling factor used in performing of the TBS scaling may be received by the UE, and on the other hand, the information field in the DCI may be fully utilized.

An embodiment of sending a downlink transmission from a base station to a UE is given below. In this embodiment, the UE is a Redcap terminal, and the downlink transmission is a message Msg.4. The method of this embodiment includes the following steps 301 to 303.

At step 301, the base station sends the message Msg.4 to the Redcap terminal, the DCI of the message Msg.4 includes TBS scaling indication information, and the TBS scaling indication information is used for indicating a scaling factor used in performing of TBS scaling.

At step 302, the Redcap terminal receives the message Msg.4 from the base station.

At step 303, the Redcap terminal determines, based on the TBS scaling indication information included in the DCI of the message Msg.4, the scaling factor used in performing of the TBS scaling.

An embodiment of the present disclosure provides an apparatus for sending a downlink transmission. The apparatus is applied to a base station. Referring to FIG. 4, this apparatus includes a communication module 401.

The communication module 401 is configured to send a downlink transmission to a UE. A DCI in the downlink transmission includes TBS scaling indication information, and the TBS scaling indication information is used for indicating a scaling factor used in performing of TBS scaling.

An embodiment of the present disclosure provides an apparatus for receiving a downlink transmission. The apparatus is applied to a UE. Referring to FIG. 5, this apparatus includes a communication module 501.

The communication module 501 is configured to receive a downlink transmission from a base station A DCI in the downlink transmission includes TBS scaling indication information, and the TBS scaling indication information is used for indicating a scaling factor used in performing of TBS scaling.

An embodiment of the present disclosure provides a network side device. The network side device includes a processor and a memory. The memory is configured to store an executable instruction executable by the processor.

The processor is configured to execute the executable instruction in the memory to implement steps of the method for sending the downlink transmission described above.

An embodiment of the present disclosure provides a mobile terminal. The mobile terminal includes a processor and a memory. The memory is configured to store an executable instruction executable by the processor.

The processor is configured to execute the executable instruction in the memory to implement steps of the method for receiving the downlink transmission described above.

An embodiment of the present disclosure provides a non-transitory computer-readable storage medium. The computer-readable storage medium stores an executable instruction, and the executable instruction, when executed by a processor, implements steps of the method for sending the downlink transmission described above, or implements steps of the method for receiving the downlink transmission described above.

FIG. 6 is a block diagram of an apparatus 600 for receiving a downlink transmission illustrated according to an embodiment. For example, the apparatus 600 may be a mobile phone, computer, digital broadcasting terminal, messaging device, game console, tablet device, medical device, fitness device, personal digital assistant, etc.

Referring to FIG. 6, the apparatus 600 may include one or more of the following components: a processing component 602, a memory 604, a power supply component 606, a multimedia component 608, an audio component 610, an input/output (I/O) interface 612, a sensor component 614, and a communication component 616.

The processing component 602 generally controls the overall operation of the apparatus 600, such as operations associated with display, telephone calls, data communication, camera operations, and recording operations. The processing component 602 may include one or more processors 620 to execute an instruction to complete all or some of the steps of the methods described above. In addition, the processing component 602 may include one or more modules that facilitate interaction between the processing component 602 and other components. For example, the processing component 602 may include a multimedia module to facilitate interaction between the multimedia component 608 and the processing component 602.

The memory 604 is configured to store various types of data to support the operations at the apparatus 600. Examples of such data include the following for any application or method to operate on the apparatus 600: instructions, contact data, phonebook data, messages, pictures, videos, etc. The memory 604 may be implemented by any type of volatile or non-volatile storage device or a combination thereof, such as a static random access memory (SRAM), electrically erasable programmable read-only memory (EEPROM), erasable programmable read-only memory (EPROM), programmable read-only memory (PROM), read-only memory (ROM), magnetic memory, flash memory, disk or CD-ROM.

The power supply component 606 supplies power to various components of the apparatus 600. The power supply component 606 may include a power supply management system, one or more power supplies, and other components associated with generating, managing, and distributing power for the apparatus 600.

The multimedia component 608 includes a screen that provides an output interface between the apparatus 600 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundaries of the touch or swipe action, but also detect the duration and pressure associated with the touch or swipe action. In some embodiments, the multimedia component 608 includes a front-facing camera and/or a rear-facing camera. The front-facing camera and/or the rear-facing camera may receive external multimedia data when the apparatus 600 is in an operating mode, such as a shooting mode or a video mode. Each of the front-facing camera and the rear-facing camera may be a fixed optical lens system or have a focal length and optical zoom capability.

The audio component 610 is configured to output and/or input audio signals. For example, the audio component 610 includes a microphone (MIC), configured to receive external audio signals when the apparatus 600 is in an operating mode, such as a calling mode, a recording mode, and a voice recognition mode. The received audio signals may be further stored in the memory 604 or sent via the communication component 616. In some embodiments, the audio component 610 further includes a speaker for outputting the audio signals.

The I/O interface 612 provides an interface between the processing component 602 and a peripheral interface module, and the peripheral interface module may be a keypad, a click wheel, a button, etc. These buttons may include, but are not limited to, a home button, a volume button, a start button, and a lock button.

The sensor component 614 includes one or more sensors, configured to provide a status assessment of various aspects of the apparatus 600. For example, the sensor component 614 may detect an open/closed state of the apparatus 600, relative positioning of the components, for example, the components are the display and keypad of the apparatus 600, the sensor component 614 may also detect a change in the position of the apparatus 600 or a change in the position of one component of the apparatus 600, the presence or absence of user contact with the apparatus 600, the orientation or acceleration/deceleration of the apparatus 600, and temperature changes of the apparatus 600. The sensor component 614 may include a proximity sensor, configured to detect the presence of nearby objects in the absence of any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate the communication between the apparatus 600 and other devices by wired or wireless means. The apparatus 600 may access a wireless network based on a communication standard, such as Wi-Fi, 2G, 3G, or a combination thereof. In an embodiment, the communication component 616 receives broadcast signals or broadcast-related information from an external broadcast management system via a broadcast channel. In an embodiment, the communication component 616 further includes a near-field communication (NFC) module to facilitate short-range communication. For example, the NFC module may be implemented based on a radio frequency identification (RFID) technology, infrared data association (IrDA) technology, ultra-wideband (UWB) technology, bluetooth (BT) technology, and the like.

In an embodiment, the apparatus 600 may be implemented by one or more of: an application-specific integrated circuit (ASIC), a digital signal processor (DSP), a digital signal processing device (DSPD), a programmable logic device (PLD), a field-programmable gate array (FPGA), a controller, a microcontroller, a microprocessor, or other electronic element, to perform the above methods.

In an embodiment, a non-transitory computer-readable storage medium including an instruction is provided, such as a memory 604 including an instruction. The instruction described above is capable of being executed by the processor 620 of the apparatus 600. For example, the non-transitory computer-readable storage medium may be a ROM, a random access memory (RAM), a CD-ROM, a magnetic tape, a floppy disk, an optical data storage device, etc.

Figure 7:
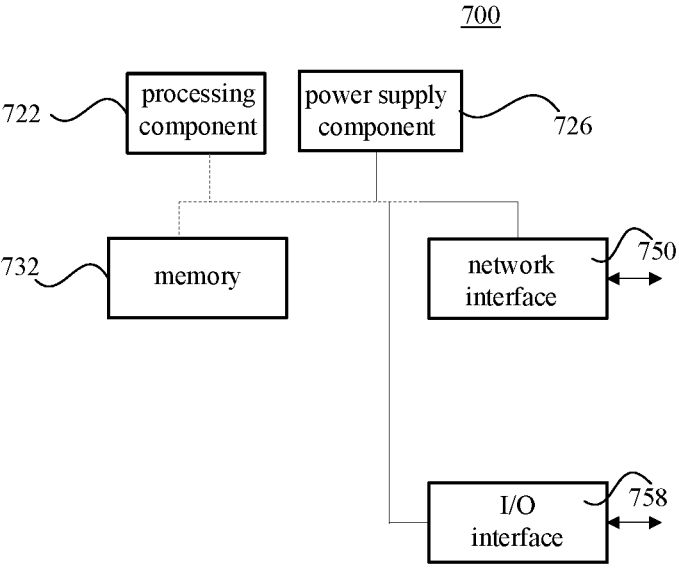
FIG. 7 is a block diagram of an apparatus for sending a downlink transmission illustrated according to an embodiment.

FIG. 7 is a block diagram of an apparatus 700 for sending a downlink transmission illustrated according to an embodiment. For example, the apparatus 700 may be provided as a base station. Referring to FIG. 7, the apparatus 700 includes a processing component 722. The processing component 722 further includes one or more processors, and a memory resource represented by a memory 732 for storing instructions, such as an application program, that may be executed by the processing component 722. The application program stored in the memory 732 may include one or more modules each corresponding to a set of instructions. In addition, the processing component 722 is configured to execute the instructions to perform the method for sending the downlink transmission described above. The apparatus 700 may further include a power supply component 726 configured to perform power management of the apparatus 700, a wired or wireless network interface 750 configured to connect the apparatus 700 to a network, and an I/O interface 758. The apparatus 700 may operate an operating system stored in the memory 732, such as Windows Server™, Mac OS X™, Unix™, Linux™, FreeBSD™, or the like.

According to one aspect of the present disclosure, a method for sending a downlink transmission is provided. This method is applied to a base station, and includes sending the downlink transmission to a user equipment (UE). A downlink control information (DCI) in the downlink transmission includes transport block size (TBS) scaling indication information, and the TBS scaling indication information is used for indicating a scaling factor used in performing of TBS scaling.

In an embodiment, the DCI including the TBS scaling indication information does not include a field used for indicating power control.

In an embodiment, the DCI including the TBS scaling indication information includes N bits used for indicating power control, where N is less than M. A DCI not including the TBS scaling indication information includes M bits used for indicating the power control, where N and M are positive integers.

In an embodiment, the DCI including the TBS scaling indication information includes S bits used for indicating a modulation and coding scheme (MCS), where S is less than T. A DCI not including the TBS scaling indication information includes T bits used for indicating the MCS, where S and T are positive integers.

In an embodiment, the DCI including the TBS scaling indication information includes T–S bits used for indicating the MCS, and the T–S bits used for indicating the MCS are used for indicating the MCS of a low order and a low bit rate.

In an embodiment, the TBS scaling indication information corresponds to a combined field in the DCI, and the combined field includes at least one bit used for indicating power control and at least one bit used for indicating the MCS.

In an embodiment, the TBS scaling indication information corresponds to T bits used for indicating an MCS, and a DCI not including the TBS scaling indication information includes T bits used for indicating the MCS.

In an embodiment, the T bits used for indicating the MCS indicate both the MSC and the scaling factor used in performing of the TBS scaling.

In an embodiment, each index value of X index values indicated by the T bits used for indicating the MCS corresponds to a scaling factor, where X is less than Y, Y is a maximum number of indexes that the T bits used for indicating the MCS are capable of indicating, and X and Y are positive integers.

In an embodiment, at least two sets of index values of the X index values correspond to a same scaling factor subset.

According to another aspect of the present disclosure, a method for receiving a downlink transmission is provided. The method is applied to a UE, and includes receiving the downlink transmission from a base station. A DCI in the downlink transmission includes TBS scaling indication information, and the TBS scaling indication information is used for indicating a scaling factor used in performing of TBS scaling.

In an embodiment, the DCI including the TBS scaling indication information does not include a field used for indicating power control.

In an embodiment, the DCI including the TBS scaling indication information includes N bits used for indicating power control, where N is less than M. A DCI not including the TBS scaling indication information includes M bits used for indicating the power control, where N and M are positive integers.

In an embodiment, the DCI including the TBS scaling indication information includes S bits used for indicating an MCS, where S is less than T. A DCI not including the TBS scaling indication information includes T bits used for indicating the MCS, where S and T are positive integers.

In an embodiment, the DCI including the TBS scaling indication information includes T–S bits used for indicating the MCS, and the T–S bits used for indicating the MCS are used for indicating the MCS of a low order and a low bit rate.

In an embodiment, the TBS scaling indication information corresponds to a combined field in the DCI, and the combined field includes at least one bit used for indicating power control and at least one bit used for indicating the MCS.

In an embodiment, the TBS scaling indication information corresponds to T bits used for indicating an MCS, and a DCI not including the TBS scaling indication information includes T bits used for indicating the MCS.

In an embodiment, the T bits used for indicating the MCS indicate both the MSC and the scaling factor used in performing of the TBS scaling.

In an embodiment, each index value of X index values indicated by the T bits used for indicating the MCS corresponds to a scaling factor, where X is less than Y, Y is a maximum number of indexes that the T bits used for indicating the MCS are capable of indicating, and X and Y are positive integers.

In an embodiment, at least two sets of index values of the X index values correspond to a same scaling factor subset.

According to another aspect of the present disclosure, an apparatus for sending a downlink transmission is provided. The apparatus is applied to a base station, and includes a communication module. The communication module is configured to send the downlink transmission to a UE. A DCI in the downlink transmission includes TBS scaling indication information, and the TBS scaling indication information is used for indicating a scaling factor used in performing of TBS scaling.

According to a fourth aspect of the embodiments of the present disclosure, an apparatus for receiving a downlink transmission is provided. The apparatus is applied to a UE, and includes a communication module. The communication module is configured to receive the downlink transmission from a base station A DCI in the downlink transmission includes TBS scaling indication information, and the TBS scaling indication information is used for indicating a scaling factor used in performing of TBS scaling.

The technical solution provided in the embodiments of the present disclosure may include the following beneficial effects: a base station sends a downlink transmission to a UE. A DCI in the downlink transmission includes TBS scaling indication information, and the TBS scaling indication information is used for indicating a scaling factor used in performing of TBS scaling. By using this method, the base station can indicate, to the UE when sending the downlink transmission, the scaling factor used in performing of the TBS scaling, thus satisfying the requirements of the UE for performing coverage enhancement.

The technical solution provided in the embodiments of the present disclosure may include the following beneficial effects: a UE receives a downlink transmission from a base station. A DCI in the downlink transmission includes TBS scaling indication information, and the TBS scaling indication information is used for indicating a scaling factor used in performing of TBS scaling. By using this method, when receiving the downlink transmission, the UE can obtain, through the received downlink transmission, the scaling factor used in performing of the TBS scaling, thus satisfying the requirements of the Redcap UE for performing coverage enhancement.

After considering the specification and practicing the embodiments disclosed herein, those skilled in the art will easily come up with other implementation solutions of the present disclosure. The present disclosure is intended to cover any variations, uses, or adaptive changes of the present disclosure, which follow the general principles of embodiments of the present disclosure and include common knowledge or commonly used technical means in the technical field that are not disclosed in the present disclosure. The specification and embodiments are only considered to be illustrative, and the true scope and spirit of the embodiments of the present disclosure are indicated by the following claims.

It should be understood that embodiments of the present disclosure is not limited to the precise structure which has been described above and illustrated in the accompanying drawings, and that various modifications and alterations may be made without departing from the scope of the present disclosure. The scope of the embodiments of the present disclosure is limited only by the appended claims.

INDUSTRIAL APPLICABILITY

A base station sends a downlink transmission to a UE. A DCI in the downlink transmission includes TBS scaling indication information, and the TBS scaling indication information is used for indicating a scaling factor used in performing of TBS scaling. The UE receives the downlink transmission from the base station, thereby determining the scaling factor. By using this method, the base station can indicate to the UE the scaling factor used in performing of the TBS scaling, thus satisfying the requirements of the UE for performing coverage enhancement.

What is claimed is:

1. A method for sending a downlink transmission, comprising:

sending, by a base station, the downlink transmission to a user equipment (UE), wherein a downlink control information (DCI) in the downlink transmission comprises transport block size (TBS) scaling indication information, and the TBS scaling indication information is used for indicating a scaling factor used in performing TBS scaling, wherein the DCI comprising the TBS scaling indication information comprises M bits, wherein N bits of the M bits are used for indicating power control, and (M−N) bits of the M bits are used for indicating the TBS scaling indication information, wherein N is less than M, and N and M are positive integers.

2. The method according to claim 1, wherein the DCI comprising the TBS scaling indication information does not comprise a field used for indicating power control.

3. The method according to claim 1, wherein the DCI comprising the TBS scaling indication information comprises T bits, wherein S bits of the T bits are used for indicating a modulation and coding scheme (MCS), and (T−S) bits of the T bits are used for indicating the TBS scaling indication information, wherein S is less than T, and S and T are positive integers.

4. The method according to claim 3, wherein the S bits used for indicating the MCS are used for indicating the MCS of a low order and a low bit rate.

5. The method according to claim 3, wherein the TBS scaling indication information corresponds to a combined field in the DCI comprising the TBS scaling indication information, and the combined field comprises at least one bit used for indicating power control and at least one bit used for indicating the MCS.

6. The method according to claim 1, wherein the TBS scaling indication information corresponds to T bits used for indicating an MCS, T is a positive integer, and the T bits, corresponding to the TBS scaling indication information and used for indicating the MCS, further indicate the scaling factor used in performing the TBS scaling.

7. The method according to claim 6, wherein the T bits, corresponding to the TBS scaling indication information and used for indicating the MCS, indicate X index values, each one of the X index values corresponds to a scaling factor, wherein X is less than Y, Y is a maximum number of indexes that the T bits used for indicating the MCS are capable of indicating, and X and Y are positive integers.

8. The method according to claim 7, wherein at least two sets of index values of the X index values correspond to a same scaling factor subset.

9. A method for receiving a downlink transmission, comprising:

receiving, by a user equipment (UE), the downlink transmission from a base station, wherein a downlink control information (DCI) in the downlink transmission comprises transport block size (TBS) scaling indication information, and the TBS scaling indication information is used for indicating a scaling factor used in performing TBS scaling, wherein the DCI comprising the TBS scaling indication information comprises M bits, wherein N bits of the M bits are used for indicating power control, and (M−N) bits of the M bits are used for indicating the TBS scaling indication information, wherein N is less than M, and N and M are positive integers.

10. The method according to claim 9, wherein the DCI comprising the TBS scaling indication information does not comprise a field used for indicating power control.

11. The method according to claim 9, wherein the DCI comprising the TBS scaling indication information comprises T bits, wherein S bits of the T bits are used for indicating a modulation and coding scheme (MCS), and (T−S) bits of the T bits are used for indicating the TBS scaling indication information, wherein S is less than T, and S and T are positive integers.

12. The method according to claim 11, wherein the S bits used for indicating the MCS are used for indicating the MCS of a low order and a low bit rate.

13. The method according to claim 11, wherein the TBS scaling indication information corresponds to a combined field in the DCI comprising the TBS scaling indication information, and the combined field comprises at least one bit used for indicating power control and at least one bit used for indicating the MCS.

14. The method according to claim 9, wherein the TBS scaling indication information corresponds to T bits used for indicating an MCS, T is a positive integer, and the T bits, corresponding to the TBS scaling indication information and used for indicating the MCS, further indicate the scaling factor used in performing the TBS scaling.

15. The method according to claim 14, wherein the T bits, corresponding to the TBS scaling indication information and used for indicating the MCS, indicate X index values, each one of the X index values corresponds to a scaling factor, wherein X is less than Y, Y is a maximum number of indexes that the T bits used for indicating the MCS are capable of indicating, and X and Y are positive integers.

16. The method according to claim 15, wherein at least two sets of index values of the X index values correspond to a same scaling factor subset.

17. A mobile terminal, comprising:
a processor; and
a memory, configured to store an executable instruction executable by the processor; wherein
the processor is configured to execute the executable instruction in the memory to implement steps of the method for receiving the downlink transmission according to claim 9.

18. A network device, comprising:
a processor; and
a memory, configured to store an executable instruction executable by the processor; wherein
the processor, through executing the executable instruction in the memory, is configured to:
send a downlink transmission to a user equipment (UE), wherein a downlink control information (DCI) in the downlink transmission comprises transport block size (TBS) scaling indication information, and the TBS scaling indication information is used for indicating a scaling factor used in performing TBS scaling,
wherein the DCI comprising the TBS scaling indication information comprises M bits, wherein N bits of the M bits are used for indicating power control, and (M−N) bits of the M bits are used for indicating the TBS scaling indication information, wherein N is less than M, and N and M are positive integers.

* * * * *